US012768584B2

(12) United States Patent
Lee et al.

(10) Patent No.: US 12,768,584 B2
(45) Date of Patent: Oct. 20, 2026

(54) REFRIGERATOR

(71) Applicant: LG ELECTRONICS INC., Seoul (KR)

(72) Inventors: Jihyun Lee, Seoul (KR); Kyukwan Choi, Seoul (KR); Minsub Kim, Seoul (KR); Hangbok Lee, Seoul (KR); Sungkyong Han, Seoul (KR); Yezo Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 365 days.

(21) Appl. No.: 18/271,324

(22) PCT Filed: Dec. 6, 2021

(86) PCT No.: PCT/KR2021/018351
§ 371 (c)(1),
(2) Date: Jul. 7, 2023

(87) PCT Pub. No.: WO2022/149736
PCT Pub. Date: Jul. 14, 2022

(65) Prior Publication Data
US 2024/0085091 A1 Mar. 14, 2024

(30) Foreign Application Priority Data
Jan. 8, 2021 (KR) ........................ 10-2021-0002736

(51) Int. Cl.
*F25D 23/02* (2006.01)
*C02F 1/32* (2023.01)
(Continued)

(52) U.S. Cl.
CPC .............. *F25D 23/028* (2013.01); *C02F 1/32* (2013.01); *F25C 5/22* (2018.01); *F25D 27/005* (2013.01);
(Continued)

(58) Field of Classification Search
CPC ................. F25D 23/028; F25D 27/005; F25D 2331/806; F25D 2327/001; F25D 23/126;
(Continued)

(56) References Cited

U.S. PATENT DOCUMENTS 7,201,005 B2 4/2007 Voglewede et al.
11,046,571 B2 6/2021 Kwon et al.
(Continued)

FOREIGN PATENT DOCUMENTS

CN 1757997 4/2006
CN 102338534 2/2012
(Continued)

OTHER PUBLICATIONS

KR 20180028777 A Translation (Year: 2018).*
(Continued)

*Primary Examiner* — Jerry-Daryl Fletcher
*Assistant Examiner* — Dario Antonio Deleon
(74) *Attorney, Agent, or Firm* — KED & ASSOCIATES, LLP

(57) ABSTRACT

A refrigerator comprises: a cabinet provided with a storage space; a refrigerator door opening/closing the storage space; and a dispenser which is provided in the refrigerator door for dispensing water or ice, wherein the dispenser comprises: a dispenser housing forming a space; a protruding member protruding from the upper side wall of the dispenser housing toward the space; a lighting member which is arranged along the circumference of the protruding member; a lighting unit which includes a plurality of light-emitting units emitting light of different colors to the lighting member; and a controller which controls one of the plurality of light-emitting units so as to be turned on according to a mode.

20 Claims, 19 Drawing Sheets

(51) Int. Cl.
*F25C 5/20* (2018.01)
*F25D 27/00* (2006.01)

(52) U.S. Cl.
CPC ................. *C02F 2201/3227* (2013.01); *C02F 2201/326* (2013.01); *C02F 2303/04* (2013.01); *C02F 2307/10* (2013.01); *F25D 2331/806* (2013.01)

(58) Field of Classification Search
CPC ................ C02F 1/32; C02F 2201/3227; C02F 2201/326; C02F 2303/04; C02F 2307/10; C02F 1/325; F25C 5/22
See application file for complete search history.

(56) References Cited

U.S. PATENT DOCUMENTS

| | | | | |
|---|---|---|---|---|
| 2005/0268624 | A1 | 12/2005 | Voglewede et al. | |
| 2010/0236270 | A1 | 9/2010 | Choi | |
| 2016/0046508 | A1* | 2/2016 | Orita | C02F 1/325 222/146.1 |
| 2016/0161169 | A1* | 6/2016 | Laible et al. | F25C 5/22 62/66 |
| 2016/0209108 | A1* | 7/2016 | Bird | F25D 23/126 |
| 2017/0131024 | A1* | 5/2017 | Kempfle et al. | F25D 11/00 |
| 2018/0003428 | A1 | 1/2018 | Kwon | |
| 2019/0093942 | A1* | 3/2019 | Scalf et al. | B67D 3/0009 |
| 2019/0186812 | A1* | 6/2019 | Shi et al. | F25C 5/22 |
| 2019/0383543 | A1* | 12/2019 | Chandra et al. | F25C 5/22 |
| 2020/0247656 | A1 | 8/2020 | Kwon et al. | |
| 2021/0316981 | A1 | 10/2021 | Kwon et al. | |
| 2022/0297996 | A1 | 9/2022 | Kwon et al. | |
| 2024/0409388 | A1 | 12/2024 | Kwon et al. | |

FOREIGN PATENT DOCUMENTS

| | | | | |
|---|---|---|---|---|
| CN | 107560276 | | 1/2018 | |
| CN | 108078383 | | 5/2018 | |
| JP | 2005-161149 | | 6/2005 | |
| KR | 20-0322784 | | 8/2003 | |
| KR | 200322784 | Y1 * | 8/2003 | F25D 23/12 |
| KR | 10-2014-0105899 | | 9/2014 | |
| KR | 20140105899 | A * | 9/2014 | F25D 29/00 |
| KR | 20150043812 | A * | 4/2015 | F25D 23/126 |
| KR | 10-2017-0142260 | | 12/2017 | |
| KR | 10-2018-0028777 | | 3/2018 | |
| KR | 20180028777 | A * | 3/2018 | B01D 35/306 |
| KR | 10-2020-0095996 | | 8/2020 | |

OTHER PUBLICATIONS

KR 20150043812 A Translation (Year: 2015).*
KR 20140105899 A Translation (Year: 2014).*
KR 200322784 Y1 Translation (Year: 2003).*
International Search Report dated Mar. 11, 2022 issued in Application No. PCT/KR2021/018351.
Extended European Search Report dated Oct. 11, 2024 issued in Application No. 21917898.5.
Chinese Office Action dated Mar. 17, 2026 issued in Application No. 202180088066.9.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2021/018351, filed Dec. 6, 2021, which claims priority to Korean Patent Application No. 10-2021-0002736, filed Jan. 8, 2021, whose entire disclosures are hereby incorporated by reference.

TECHNICAL FIELD

The present embodiment relates to a refrigerator.

BACKGROUND ART

In general, a refrigerator is a home appliance that stores food at a low temperature in a storage space of an interior shielded by a refrigerator door, and the refrigerator is configured to keep the stored food in an optimal condition by cooling the inside of the storage space using cold air generated through heat exchange with a refrigerant circulating in the refrigeration cycle.

Refrigerators are gradually becoming larger and more multi-functional in accordance with changes in eating habits and the trend of high quality products, and refrigerators equipped with various structures and convenient devices considering user convenience are being released.

In Korean Utility Model Registration No. 20-0322784, which is a prior document, a refrigerator dispenser having a sterilization means is disclosed.

The refrigerator dispenser of the prior document includes sterilization means having an ultraviolet lamp provided on the upper surface of the refrigerator dispenser to emit ultraviolet rays having a sterilizing effect on a cup disposed thereunder, a weight sensor providing signals to the microcomputer, which detect the weight when drinking water is dispensed after the switch for dispensing drinking water provided on the rear side of the dispenser operates and the weight of the cup placed back on the bottom of the dispenser after dispensing drinking water, and an ultraviolet lamp driving portion for driving an ultraviolet lamp according to a signal from a microcomputer which determines the cup storage mode based on signals from the weight sensor.

In the case of these prior documents, the cup placed in the dispenser can be sterilized, but there is a disadvantage in that sterilization is impossible for the inside of the flow path for dispensing drinking water.

DISCLOSURE

Technical Problem

The present embodiment provides a refrigerator capable of sterilizing a flow path through which water is dispensed.

Optionally or additionally, the present embodiment provides a refrigerator in which a user can confirm that the flow path through which water is dispensed is being sterilized.

Optionally or additionally, the present embodiment provides a refrigerator in which a user can easily check whether the dispenser is in a normal mode or a sterilization mode.

Optionally or additionally, the present embodiment provides a refrigerator in which a front surface of a lever for a user's manipulation may form the same surface as a rear wall of the dispenser housing.

Optionally or additionally, the present embodiment provides a refrigerator in which a user can easily control the amount of water discharged.

Optionally or additionally, the present embodiment provides a refrigerator in which a key for a user to manipulate is prevented from being exposed to the outside in a standby state.

Technical Solution

A refrigerator according to an aspect may include a cabinet having a storage space; a refrigerator door configured to open and close the storage space; and a dispenser provided on the refrigerator door and configured to dispense water or ice.

The dispenser may include a dispenser housing forming a space; a protruding member protruding into the space from an upper side wall of the dispenser housing; a lighting member disposed along the circumference of the protruding member; a lighting unit including a plurality of light-emitting units of different colors for emitting light to the lighting member; and a controller configured to control one of the plurality of light-emitting units to be turned on according to a mode.

A discharge pipe through which water is dispensed and an ice chute through which ice is discharged may be disposed on the protruding member.

The refrigerator may further include a sterilization module for emitting ultraviolet rays into the discharge pipe.

The mode may include a normal mode in which the sterilization module does not operate and a sterilization mode in which the sterilization module operates.

The dispenser may further include a lever for dispensing the water or ice disposed in the dispenser housing.

The controller may turn on a first light-emitting unit of the plurality of light-emitting units in the sterilization mode. The controller may turn on a second light-emitting unit of the plurality of light-emitting units when a manipulation of the lever is detected in the normal mode.

The protruding member may include a first body having a rounded portion; and a second body disposed below the first body.

The lighting member may include a rounded first part disposed at a boundary between the first body and the second body.

The first part may be disposed to surround the outside of the ice chute.

The first part may include an outer circumferential surface exposed to the space and an inner circumferential surface positioned opposite to the outer circumferential surface. An uneven portion may be provided on the inner circumferential surface.

The lighting member may further include a second part bent in a vertical direction from the first part; and a third part extending from the second part toward the plurality of light-emitting units.

The sterilization module may be located in an area formed by the first part. The first body may be provided with buttons for selecting either one of a state where water can be dispensed and a state where ice can be dispensed.

The dispenser may further include a lever provided in the dispenser housing and manipulated by a user to dispense water or ice.

The dispenser housing may include a rear wall having a recessed portion in which the lever is accommodated. The front surface of the lever may form the same surface as the rear wall in a state where the lever is not manipulated.

The protruding member may include a first body protruding into the space from an upper side wall of the dispenser housing; and a second body disposed below the first body. The second body may be rotated with respect to the first body.

The amount of water dispensed may be capable of being selected by rotating the second body.

The second body may be formed in a cylindrical shape, and a protrusion is formed on an outer circumferential surface of the refrigerator.

A plurality of display elements displaying the amount of water dispensed may be provided in the first body.

The second body may be stopped at a point where the protrusion corresponds to any one of the plurality of display elements.

The dispenser may further include a supporter rotatably supporting the second body.

The supporter may include a guide for guiding rotation of the second body.

A discharge pipe through which water is dispensed and an ice chute through which ice is discharged may be disposed in the supporter.

The guide may be provided with a plurality of protrusion grooves spaced apart from each other. The second body may include an elastic deformation portion having a protrusion that can be inserted into any one of the plurality of protrusion grooves during rotation.

The lighting member may be disposed between the first body and the second body.

The refrigerator may further include a first lighting module for emitting light to the lighting member. The refrigerator may further include a second lighting module for radiating light from the lighting member to a point corresponding to the protrusion when the protrusion of the second body is positioned at a point corresponding to any one of the plurality of display elements.

The refrigerator may further include an input portion provided in the dispenser housing. The input portion may include a main key and a plurality of selection keys that are activated when the main key activated in an inactive state is selected.

The main key may be activated in a standby state. The activation state may mean a state where selection of a main key or a plurality of selection keys is detected and a state where a light emitting element emits light to the main key or a plurality of selection keys.

The main key may be deactivated in the standby state. The main key may be activated when a proximity sensor detects that a user has approached the refrigerator door within a predetermined distance.

When one key is selected in a state in which the plurality of selection keys are activated, the light intensity of the selected key may be greater than those of the other keys.

A refrigerator according to another aspect may include a cabinet having a storage space; a refrigerator door opening and closing the storage space; and a dispenser for dispensing water or ice provided on the refrigerator door. The dispenser may include a dispenser housing forming a space; a lever provided in the dispenser housing and manipulated by a user to dispense water or ice; a first body protruding into the space from an upper side wall of the dispenser housing; and a second body disposed below the first body and rotatably disposed below the first body. By rotating the second body, the amount of water to be dispensed can be selected.

The second body may be formed in a cylindrical shape, and a protrusion may be formed on an outer circumferential surface.

A plurality of display elements displaying the amount of water dispensed may be provided on the first body.

The second body may be stopped at a point where the protrusion corresponds to any one of the plurality of display elements.

A supporter rotatably supporting the second body may be further included. The supporter may include a guide for guiding rotation of the second body. A discharge pipe through which water is discharged and an ice chute through which ice is discharged may be disposed in the supporter.

The guide may include a plurality of protrusion grooves spaced apart from each other, and the second body may include an elastic deformation portion having a protrusion insertable into any one of the plurality of protrusion grooves during rotation.

The dispenser may further include a lighting member disposed between the first body and the second body, a first lighting module for emitting light to the lighting member, and a second lighting module for emitting light to a point of the lighting member corresponding to the protruding portion when the protrusion of the second body is located at a point corresponding any one of the plurality of display elements.

A refrigerator according to another aspect may include a cabinet having a storage space; a refrigerator door opening and closing the storage space; and a dispenser provided on the refrigerator door for dispensing water or ice. The dispenser may include a dispenser housing forming a space and an input portion provided in the dispenser housing.

The input portion may include a main key and a plurality of selection keys activated when the main key activated in an inactive state is selected.

The main key may be activated in a standby state.

The activation state may mean a state where selection of a main key or a plurality of selection keys is detected and a state where the light emitting element emits light to the main key or the plurality of selection keys.

The main key may be deactivated in a standby state and activated when a proximity sensor detects that a user has approached the refrigerator door within a predetermined distance.

In a state where the plurality of selection keys are activated, when any one key is selected, the light intensity of the selected key may be greater than that of the other keys.

Advantageous Effect

According to the present embodiment, since the flow path of the water discharge pipe through which water is dispensed can be sterilized, hygiene can be improved.

Since light of a specific color is transmitted through the transmission member while the sterilization mode is being performed, the user can easily check that the flow path through which the water is dispensed is being sterilized.

According to the present embodiment, the user can easily check whether the dispenser is in a normal mode (non-sterilization mode) or a sterilization mode by classifying the colors transmitted through the transmission member.

According to the present embodiment, since the transmission member is disposed in a rounded shape, the user can check the light transmitted through the transmission member regardless of the user's position.

According to the present embodiment, since the front surface of the lever for user's manipulation can form the same surface as the rear wall of the dispenser housing, aesthetics can be improved and cleanliness can be improved.

According to the present embodiment, when the second body is configured to be rotatable, there is an advantage that the user can easily adjust the amount of discharged water.

According to the present embodiment, it is possible to prevent a key for a user to manipulate from being exposed to the outside in a standby state.

DESCRIPTION OF DRAWINGS

FIGS. 21 to 24 are views illustrating a dispenser according to another embodiment of the present disclosure, wherein FIG. 21 illustrates a state where the main key of the input portion is displayed, FIG. 22 illustrates a state where the main key of the input portion and a plurality of selection keys are displayed, FIG. 23 illustrates a state where one of a plurality of selection keys is selected, and FIG. 24 is a view illustrating a state where one selection key in FIG. 23 is selected.

BEST MODE

Figure 1:
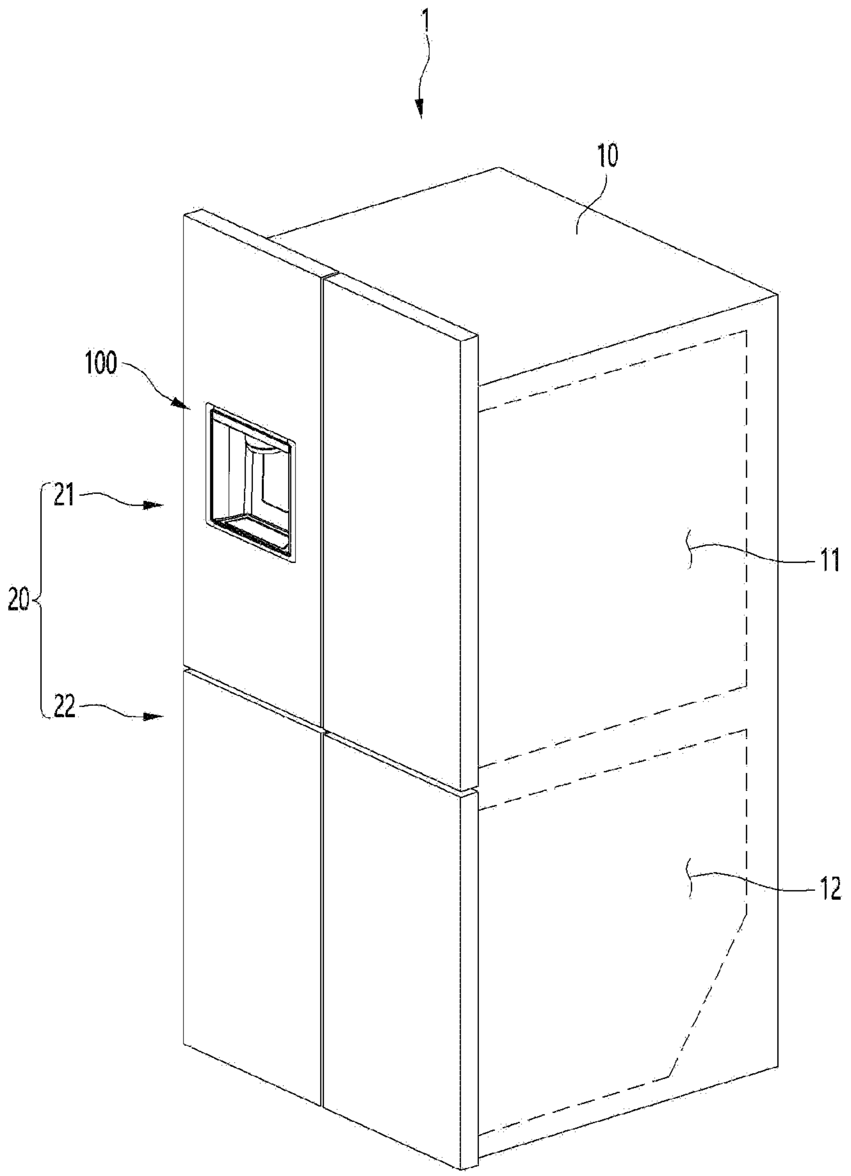
FIG. 1 is a perspective view illustrating a refrigerator according to the present embodiment.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
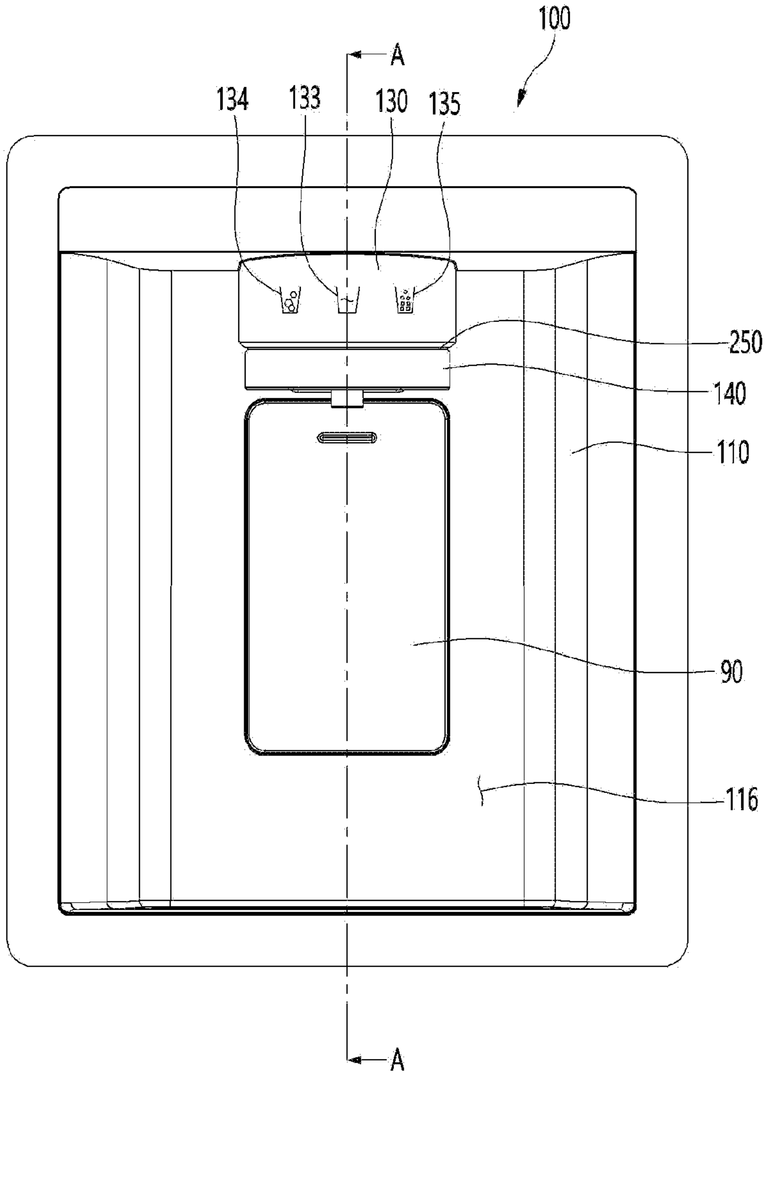
FIG. 2 is a view illustrating a dispenser provided on a refrigerator door.
Figure 3:
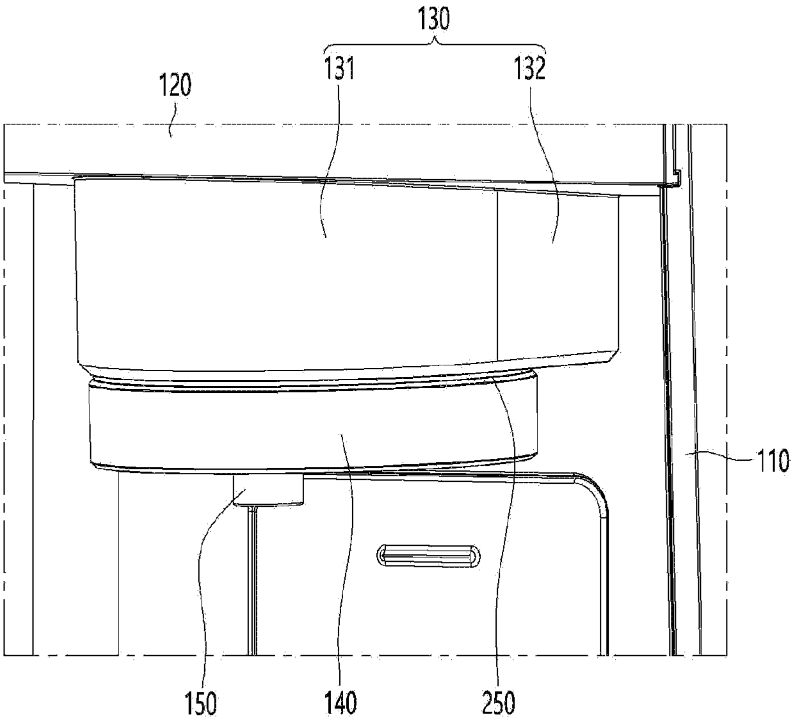
FIG. 3 is an enlarged view illustrating a display and a transmission member in the dispenser of FIG. 2.
Figure 4:
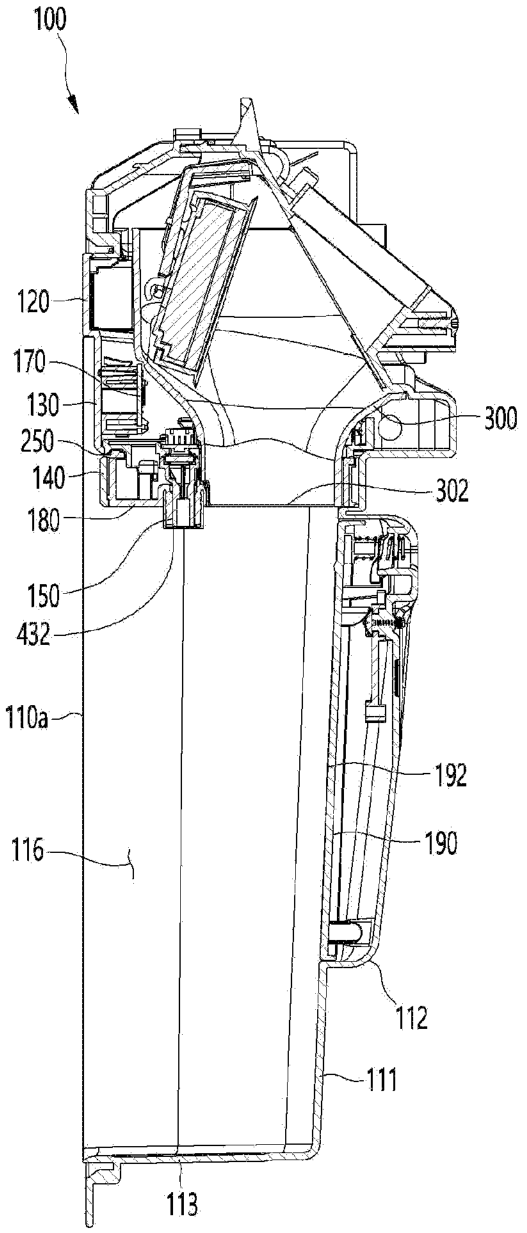
FIG. 4 is a cross-sectional view taken along line A-A of FIG. 2.

FIG. 1 is a perspective view illustrating a refrigerator according to the present embodiment, FIG. 2 is a view illustrating a dispenser provided on a refrigerator door, FIG. 3 is an enlarged view illustrating a display and a transmission member in the dispenser of FIG. 2, and FIG. 4 is a cross-sectional view taken along line A-A of FIG. 2.

Referring to FIGS. 1 to 4, the refrigerator 1 according to the present embodiment may include a cabinet 10 having a storage space and a refrigerator door 20 opening and closing the storage space.

The storage space is not limited, but may be divided into an upper first space 11 and a lower second space 12, and the refrigerator door 20 also may include a first door 21 that opens and closes the first space 11 and a second door 22 that opens and closes the second space 12.

The first space 11 may be a refrigerating chamber, and the second space 12 may be a freezing chamber or vice versa. Alternatively, it is also possible that the storage space includes a first space and a second space divided into left and right sides. Alternatively, the storage space may be a single space, and a single refrigerator door may open and close the storage space.

At least one of the first door 21 and the second door 22 may be a rotation type door. Alternatively, the single refrigerator door 20 may be a rotation type door.

In the present embodiment, a state where the two first doors 21 are disposed in the left and right direction will be described as an example.

The first door 21 may be rotatably connected to the cabinet 10 by a hinge device.

Any one of the two first doors 21 may include the dispenser 100. The dispenser 100 may discharge water and/or ice. FIG. 1 illustrates that the dispenser 100 is provided in the first door 21 on the left side as an example.

The dispenser 100 may include a dispenser housing 116. A portion of the dispenser housing 110 may be recessed backward to form a space 116 in which a cup or container may be placed.

The dispenser housing 110 may include a lower wall 113 capable of supporting cups or containers, and a rear wall 111 extending upward from the lower wall 113. The rear wall 111 may be vertical or inclined with respect to the lower wall 113.

The rear wall 111 may extend upward from the rear end of the lower wall 113. An opening **110*a* is formed at the front end of the lower wall 113**, and the rear end is a portion located on the opposite side of the front end.

For example, in FIG. 4, the rear wall 111 may be inclined in a direction away from the opening 110*a* of the dispenser housing 110 toward the upper side.

The rear wall 111 may include a recessed portion 112 formed by partially recessing backward. A lever 190 manipulated by a user to dispense water or ice may be positioned in the recessed portion 112. The lever 190 may be coupled to the rear wall 111 so as to be pivotable within the recessed portion 112.

The front surface 192 of the lever 190 may form a continuous surface with the rear wall 111. In other words, in a state before the lever 190 is manipulated, the front surface 192 of the lever 190 may form the same surface as the rear wall 111.

Therefore, according to the present embodiment, since the lever 190 does not protrude from the dispenser housing 110, a sense of unity between the lever 190 and the dispenser housing 110 can be improved.

In addition, since the lever 190 does not protrude from within the dispenser housing 110, cleanliness of the dispenser housing 110 can be improved. In other words, when cleaning the dispenser housing 110 with a rag or the like, the lever 190 does not interfere, and the front surface and the rear wall 111 of the lever 190 can be easily cleaned.

The dispenser 100 may further include a dispenser cover 120 coupled to the dispenser housing 110. The dispenser cover 120 may be coupled to the front surface of the dispenser housing 110 to form a portion of the outer appearance of the dispenser 100.

The dispenser cover 120 may include a first body 130 disposed in a protruding form in the space 116. The first body 130 may serve as a display.

The first body 130 may include a rounded portion 131 (or a front portion) in which buttons 133, 134, and 135 are provided. The first body 130 may further include straight portions 132 (or extension portions) extending backward from both end portions of the rounded portion 131. In practice, the rounded portion 131 may serve as a display.

Alternatively, the first body 130 may include a first rounded portion provided with buttons 133, 134, and 135, and a second rounded portion extending rearward from both end portions of the rounded portion.

The rounded portion 131 may be located behind the opening 110*a* of the dispenser housing 110.

The buttons 133, 134, and 135 may be arranged in a horizontal direction in the rounded portion 131. The buttons 133, 134, and 135 may include first to third buttons.

The first button 133 is a water selection button selected to switch to a state where water can be dispensed. The second button 134 and the third button 135 are ice selection buttons that are selected to switch to a state where ice can be dispensed. In addition, the second button 134 and the third button 135 are buttons for selecting the type of ice.

The second button 134 is a button selected to dispense normal ice, and the third button 135 is a button for selecting the pieces of ice (crushed ice). Normal ice refers to ice itself generated by an ice maker (not illustrated), and the pieces of ice refer to ice in a state where normal ice is crushed by a blade.

Although not limited, the first button 133 may be disposed between the second button 134 and the third button 135. When the first button 133 is located in the center of the buttons, it is possible for the user to easily recognize and manipulate the first button 133.

The dispenser 100 may further include a detection assembly 170 (or a light emitting assembly) detecting button manipulation of the buttons 133, 134, and 135 and emitting light in response to the manipulated buttons 133, 134, and 135.

The detection assembly 170 may be disposed within an area formed by the first body 130. For example, the detection assembly 170 may be disposed to face the rounded portion 131 from the rear side of the rounded portion 131.

The detection assembly 170 can include a switch that detects mechanical manipulation of the buttons 133, 134, and 135 or a touch sensor that detects a change in capacitance when the buttons 133, 134, and 135 are touched. In the present embodiment, it should be noted that there is no limitation on the types of sensors for detecting manipulations of the buttons 133, 134, and 135.

Although not illustrated, the detection assembly 170 may include first to third light emitting elements.

When the first button 133 is selected, light may be emitted from the first light emitting element to the first button 133 or to the periphery of the first button 133. When the second button 134 is selected, light may be emitted from the second light emitting element to the second button 134 or to the periphery of the second button 134. When the third button 135 is selected, light may be emitted from the third light emitting element to the third button 135 or to the periphery of the third button 135.

The dispenser 100 may further include a transmission member 250 (or a lighting member) positioned below the first body 130.

The dispenser 110 may further include a second body 140 positioned below the transmission member 250.

The second body 140 may be formed in a cylindrical or ring shape with an empty inside, for example.

In the present embodiment, since the first body 130 and the second body 140 are disposed protruding into the space 116, the first body 130 and the second body 140 may be collectively referred to as protruding members. The transmission member 250 may be disposed to be rounded along the perimeter (circumference) of the protruding member.

The second body 140 may support the transmission member 250. The lower end of the first body 130 and the upper end of the second body 140 may be spaced apart from each other. A portion of the transmission member 250 may be positioned between the lower end of the first body 130 and the upper end of the second body 140.

The transmission member 250 is a portion through which light emitted from the lighting module 200 to be described later is transmitted. When light is transmitted through the transmission member 250, the user can check the light transmitted through the transmission member 250.

In the present embodiment, since the transmission member 250 is positioned at the boundary area between the first body 130 and the second body 140, the user can easily check the light transmitted through the boundary area between the first body 130 and the second body 140.

A radius of the second body 140 may be smaller than a radius of the rounded portion 132 of the first body 130. The center of the second body 140 may coincide with the center of the rounded portion 132. In this case, since the second body 140 and the first body 130 are disposed in a stepped shape, the light is transmitted through the transmission member 250 between the first body 130 and the second body 140, the recognition ability of light can be further improved.

The dispenser 100 may further include a supporter 180 connecting the second body 140 and the first body 130.

The supporter 180 is composed of one or two or more members and may connect the second body 140 and the first body 130.

A portion of the supporter 180 may be accommodated in the second body 140. A portion of the supporter 180 may support the transmission member 250.

The dispenser 100 may further include a discharge port 150 for discharging water. The discharge port 150 may be provided in the supporter 180, for example. The discharge port 150 may protrude downward from the second body 140. Accordingly, the user can easily check the discharge port 150 and can easily align a cup or container with the discharge port 150.

A discharge pipe 432 of a water pipe 430 to be described later may be inserted into the discharge port 150. In other words, water is actually discharged through the discharge pipe 432 and the discharge port 150 may serve to protect the discharge pipe 432.

The dispenser 100 may further include an ice chute 300 providing a flow path through which ice is discharged. The ice discharge port 302 of the ice chute 300 may be positioned to pass through the supporter 180 in the second body 140.

In this case, the discharge pipe 132 may be located in front of the ice discharge port 302. In other words, the discharge pipe 132 may be located closer to the opening 110*a* of the dispenser housing 110 than the ice discharge port 302.

Figure 5:
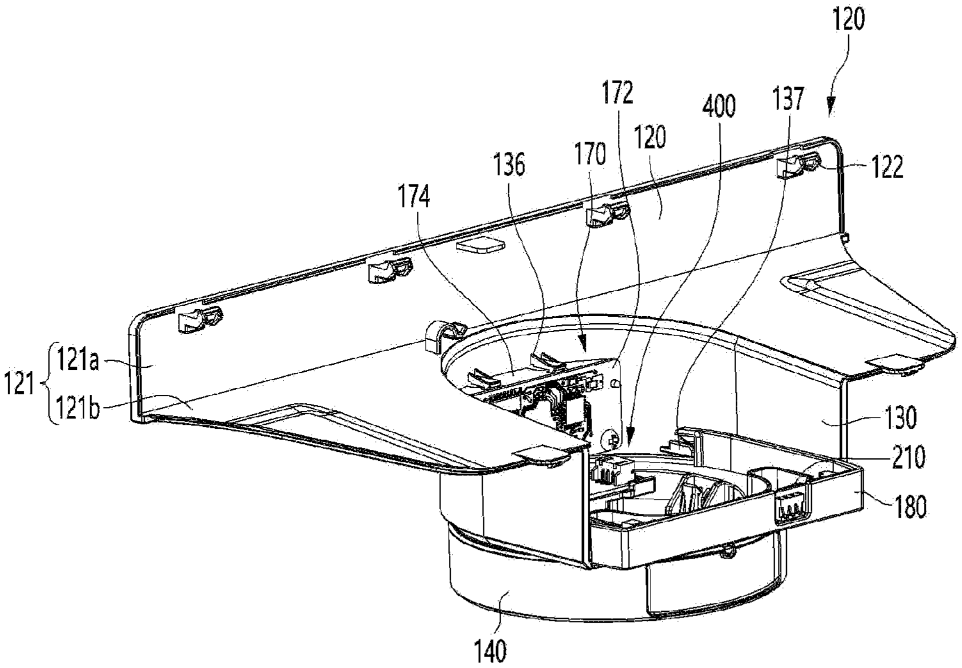
FIG. 5 is a view illustrating the rear side of the dispenser cover of the present embodiment.
Figure 6:
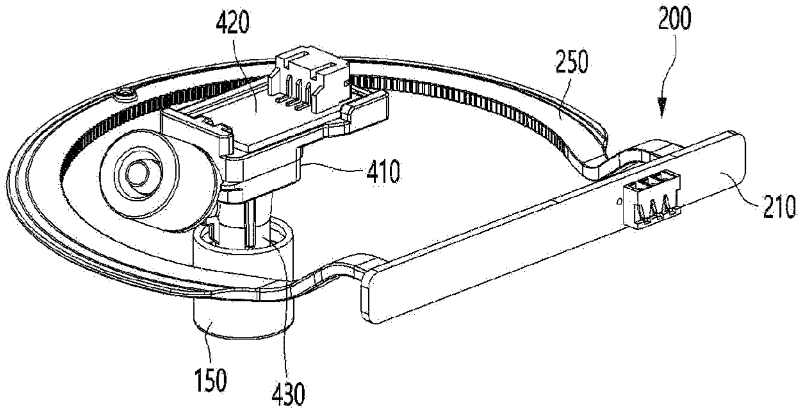
FIG. 6 is a perspective view illustrating a lighting module and a sterilization module of the present embodiment.
Figure 7:
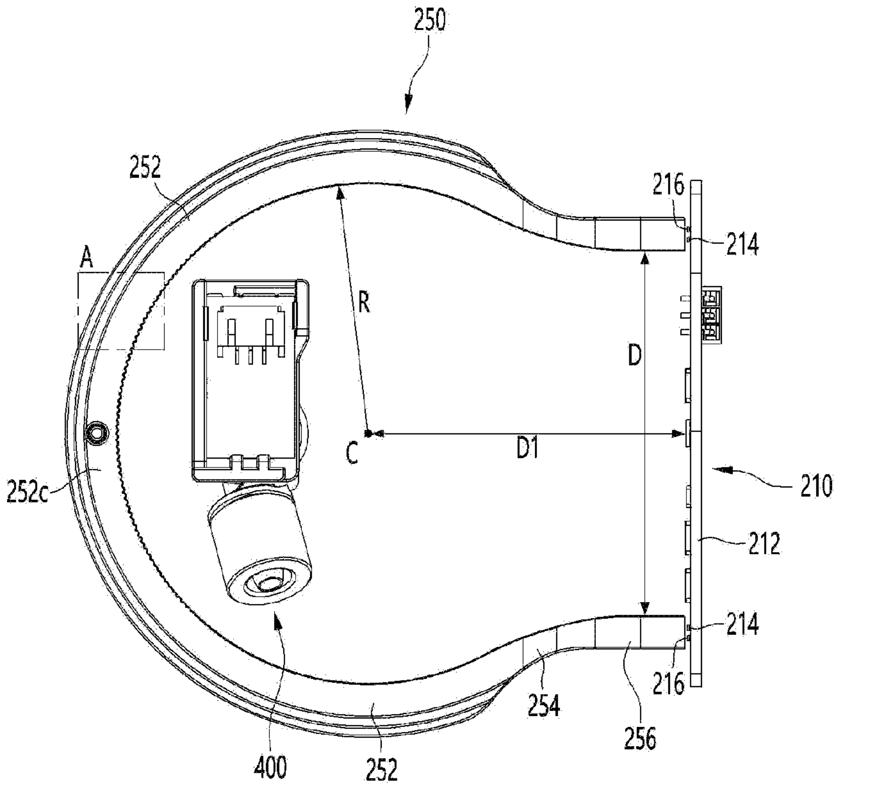
FIG. 7 is a plan view illustrating the lighting module and the sterilization module of the present embodiment.

FIG. 5 is a view illustrating the rear side of the dispenser cover of the present embodiment, FIG. 6 is a perspective view illustrating a lighting module and a sterilization module of the present embodiment, and FIG. 7 is a plan view illustrating the lighting module and the sterilization module of the present embodiment.

Figure 8:
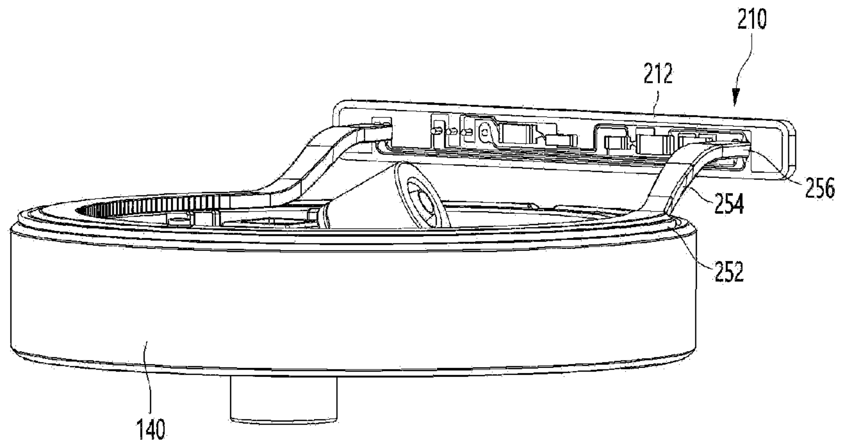
FIG. 8 is a perspective view illustrating the disposition relationship between a lighting module and a second body.
Figure 9:
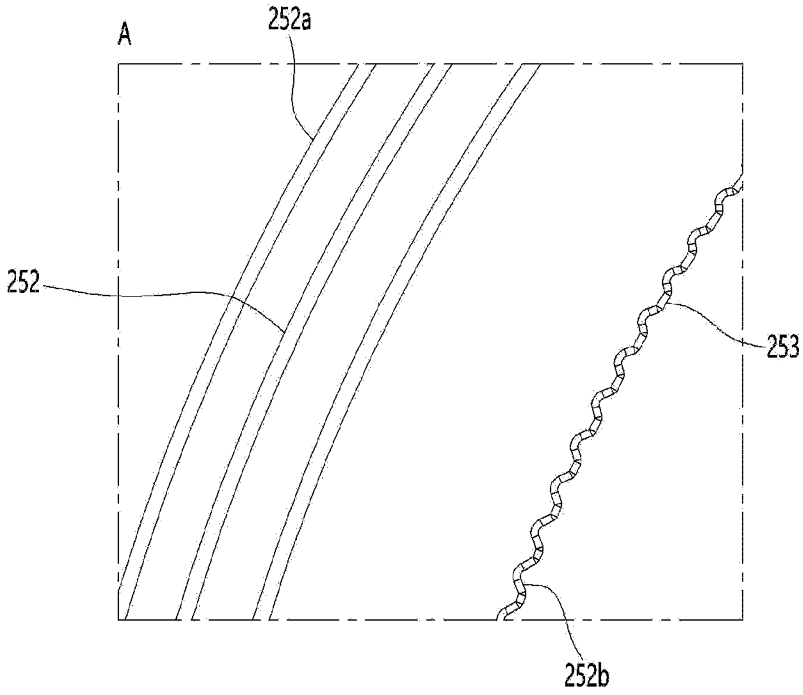
FIG. 9 is an enlarged view illustrating part A of FIG. 7.
Figure 10:
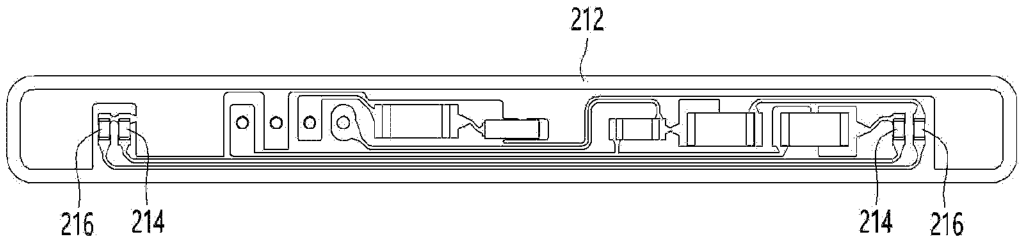
FIG. 10 is a view illustrating a PCB of a lighting module.

FIG. 8 is a perspective view illustrating the disposition relationship between a lighting module and a second body, FIG. 9 is an enlarged view illustrating part A of FIG. 7, and FIG. 10 is a view illustrating a PCB of a lighting module.

Referring to FIGS. 5 to 10, the dispenser cover 120 may include a coupling body 121 coupled to the dispenser housing 110.

The coupling body 121 may include a first member 121*a* extending in a vertical direction. The coupling body 121 may further include a second member 121*b* bent from the first member 121 and extending in a horizontal direction.

One or more coupling portions 122 may be provided on each of the first member 121*a* and the second member 121*b*.

The first body 130 may extend downward from the second member 121*b*.

The first body 130 may be integrally formed with the second member 121*b* or manufactured separately and coupled thereto.

A coupling hook 136 for coupling the detection assembly 170 may be provided to the rounded portion 131 of the first body 130.

As another example, the dispenser cover 120 is omitted, the first body 130 is directly coupled to the dispenser housing 110, or the first body 130 can also be integrally formed with the dispenser housing 110.

In any case, the first body 130 may extend downward from the upper side wall of the dispenser housing 110 and protrude into the space 116.

The detection assembly 170 may include a PCB (printed circuit board) 172 and a housing 174 accommodating the PCB 172. The housing 174 may protect a sensor and a light emitting element disposed on the PCB 172.

The PCB 172 may be coupled to the housing 174.

The housing 174 may include a rounded portion corresponding to the rounded portion 131.

The housing 174 may be coupled to the coupling hook 136 in a state where the PCB 172 is in an upright state.

A portion of the supporter 180 may be located in a space where the first body 130 is formed.

The supporter 180 may support the sterilization module 400 for sterilizing the water pipe 430 through which water flows. The sterilization module 400 may be located at the rear of the detection assembly 170 in a state of being supported by the supporter 180.

The dispenser 100 may further include a lighting module 200. The supporter 180 may support the lighting module 200.

The lighting module 200 may include a lighting unit 210. The lighting module 200 may further include the transmission member 250.

The lighting unit 210 may include a lighting PCB 212 and a plurality of light-emitting units 214 and 216 installed in the lighting PCB 212.

Light emitted from one or more of the plurality of light-emitting units 214 and 216 may pass through the transmission member 250.

The lighting PCB 212 may be installed on the supporter 180 in an upright state. To prevent interference between the lighting PCB 212 and the ice chute 300, the lighting PCB 212 may be positioned on the opposite side of the PCB 172 based on the ice chute 300.

As described above, the lighting PCB 212 may be positioned behind the ice chute 300 to avoid the ice chute 300 so that the ice chute 300 penetrates the supporter 180.

When the lighting PCB 212 is located at the rear of the ice chute 300, the transmission member 250 providing a path of light also may be disposed to surround a circumference of the ice chute 300 so as not to interfere with the ice chute 300.

In this case, the length of the transmission member 250 may be increased, and thus a surface area through which light may be transmitted may be increased, so that a user may easily recognize the light.

In addition, when the transmission member 250 emits light entirely along the circumference of the second body 140, aesthetics may be improved compared to the case where light is transmitted in a certain portion.

The transmission member 250 may include a first part 252 disposed between the first body 130 and the second body 140. The transmission member 250 may further include a second part 254 bent at both end portions of the first part 252. The transmission member 250 may further include a third part 256 extending from the second part 254 toward the lighting PCB 212.

For example, the first part 252 may be formed to be rounded in a horizontal direction. For example, the first part 252 may be formed in an arc shape.

The first part 252 may include an outer circumferential surface 252*a* and an inner circumferential surface 252*b*. The outer circumferential surface 252*a* may be exposed to the space 116 of the dispenser housing 110.

An uneven portion 253 may be provided on the inner circumferential surface 252*b* so that light emitted from the light-emitting units 214 and 216 may be reflected from the inner circumferential surface 252*b*. In other words, grooves or protrusions may be arranged at regular intervals on the inner circumferential surface 252*b*.

By the uneven portion 253, when light is reflected from the uneven portion 253, the reflected light may be evenly transmitted along the outer circumferential surface 252*a* of the first part 252.

Therefore, the user can recognize that the entire first part 252 is emitted with light, so that light recognition and aesthetics can be improved.

The first part 252 may be positioned at a different height from the lighting PCB 212. Accordingly, the second part 254 may extend from both end portions of the first part 252 to be inclined upward.

The third part 256 may extend in a substantially horizontal direction from the second part 254. The pair of third parts 256 may be disposed to face the light-emitting units 214 and 216 installed in the lighting PCB 210.

The lighting PCB 212 may include a plurality of first light-emitting units 214 spaced apart in a horizontal direction and a plurality of second light-emitting units 216 spaced apart in a horizontal direction.

A color of light emitted from the first light-emitting unit 214 may be different from a color of light emitted from the second light-emitting unit 216. For example, the plurality of first light-emitting units 214 may be BLUE LEDs, and the plurality of second light-emitting units 216 may be WHITE LEDs.

For example, one or more first light-emitting units 214 and one or more second light-emitting units 216 form a first group, and the light-emitting units of the first group and one of the pair of first parts 256 may face each other.

One or more first light-emitting units 214 and one or more second light-emitting portions 216 may form a second group. The light-emitting units of the second group may be spaced apart from the light-emitting units of the first group in a horizontal direction. The light-emitting units of the second group and one of the pair of first parts 256 may face each other.

A radius R of the first part 252 may be smaller than a distance D between the pair of third parts 256. A diameter of the first part 252 may be greater than a distance D between the pair of third parts 256.

A horizontal distance D1 between the curvature center C of the first part 252 and the lighting PCB 212 may be smaller than the radius R of the first part 252.

The radius R of the first part 252 may be smaller than the radius of the second body 140. Accordingly, the second body 140 and the first part 252 may be disposed in a stepped shape, so that the visibility of the light transmitted through the transmission member 250 may be improved.

To prevent interference between the first part 252 and the sterilization module 400, the sterilization module 400 may be located in an area formed by the first part 252.

For example, the sterilization module 400 may be disposed between a part 252*c* of the first part 252 that is farthest from the lighting PCB 210 and the curvature center C of the first part 252.

Figure 11:
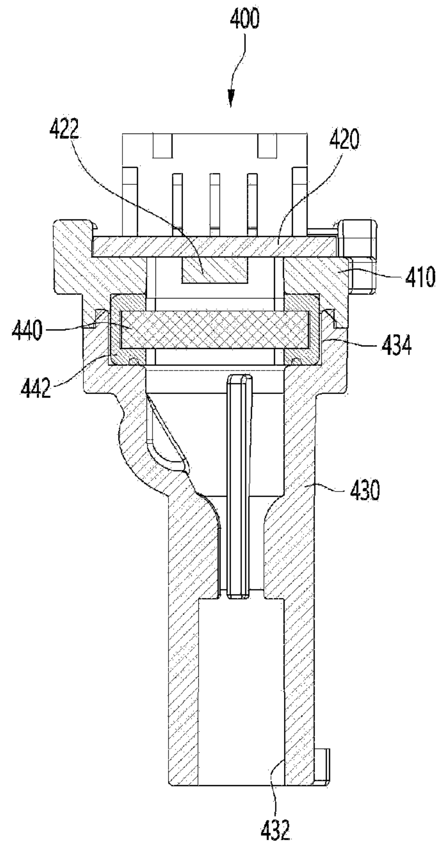
FIG. 11 is a cross-sectional view illustrating a sterilization module installed on the opening side of the discharge pipe according to the present embodiment.

FIG. 11 is a cross-sectional view illustrating a sterilization module installed on the opening side of the discharge pipe according to the present embodiment.

Referring to FIG. 11, the sterilization module 400 may emit the water pipe 430 with ultraviolet rays to sterilize the flow path in the water pipe 430 and the water passing through the flow path.

The sterilization module 400 may include a PCB 420 in which an ultraviolet ray generator 422 is installed, and a housing 410 accommodating the PCB 420.

An opening 434 may be provided in the water pipe 430. The housing 410 may be coupled to the water pipe 430 so that the UV generator 422 is aligned with the opening 434.

The ultraviolet rays emitted from the ultraviolet generator 422 may reach the discharge pipe 432 located at the end portion of the water pipe 430.

A transmission portion 440 capable of transmitting the ultraviolet rays may be provided in the opening 434. The transmission portion 440 may restrict the flow of water toward the UV generator 422 while permitting the transmission of light. A sealing member 442 may be coupled to the perimeter of the transmission portion 440. Water may be prevented from flowing toward the UV generator 422 and the PCB 420 by the sealing member 442. The sealing member 442 may surround the PCB 420 so as to contact the upper and lower surfaces of the transmission portion 440, respectively.

Figure 12:
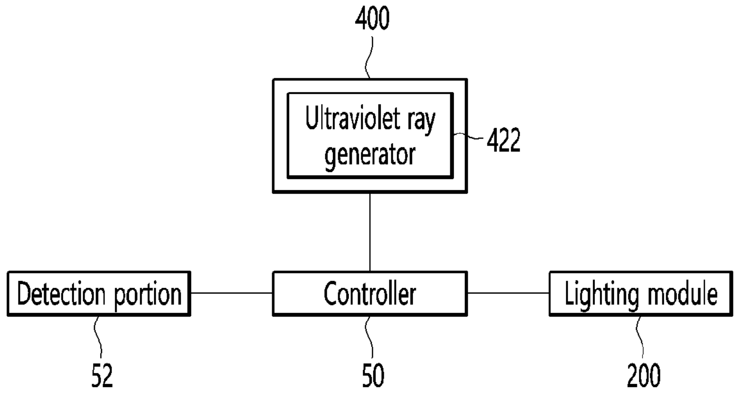
FIG. 12 is a block diagram for controlling the refrigerator according to the present embodiment.
Figure 13:
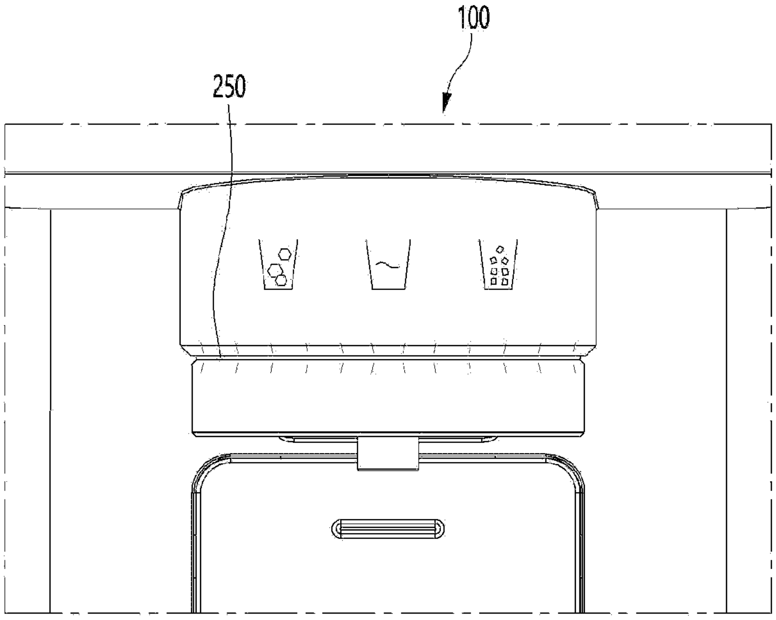
FIG. 13 is a view illustrating a state where a first light-emitting unit is turned on in a dispenser.
Figure 14:
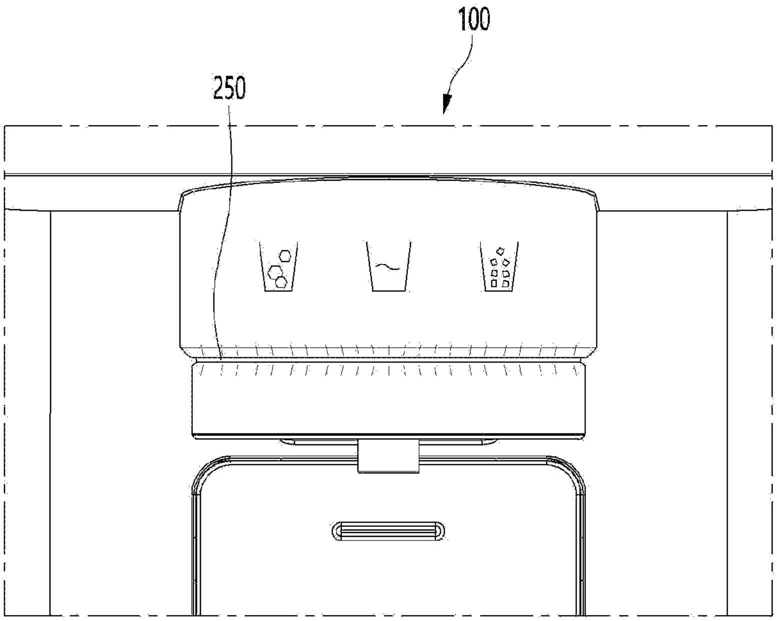
FIG. 14 is a view illustrating a state where a second light-emitting unit is turned on in a dispenser.

FIG. 12 is a block diagram for controlling the refrigerator according to the present embodiment, FIG. 13 is a view illustrating a state where a first light-emitting unit is turned on in a dispenser, and FIG. 14 is a view illustrating a state where a second light-emitting unit is turned on in a dispenser.

First, referring to FIG. 12, the refrigerator 1 according to the present embodiment may include a controller 50 for overall control or control of some components.

The controller 50 may control at least the sterilization module 400 and the lighting module 200.

The refrigerator 1 may further include a detection portion 52 capable of detecting manipulation of the lever 190.

The controller 50 may control the first light-emitting unit 214 and the second light-emitting unit 216 to be turned off when the manipulation of the lever 190 is not detected by the detection portion 52.

The controller 50 may turn on any one of the first light-emitting unit 214 and the second light-emitting unit 216 when manipulation of the lever 190 is detected by the detection portion 52. For example, the second light-emitting unit 216 may be turned on.

Then, the light emitted from the second light-emitting unit 216 is transmitted through the transmission member 250, and the user can check the light of the first color.

In a state where the second light-emitting unit 216 is turned on, the intensity of light of the second light-emitting unit 216 may be maintained constant or may be reduced step by step.

When the sterilization module 400 operates, the other one of the first light-emitting unit 214 and the second light-emitting unit 216 is turned on regardless of the detection of the manipulation of the lever 190 by the detection portion 52. For example, the first light-emitting unit 214 may be turned on.

Then, the light emitted from the first light-emitting unit 214 is transmitted through the transmission member 250, and the user can check the light of the second color.

By checking the color of the light transmitted through the transmission member 250, the user can easily check whether the sterilization mode in which the sterilization module 400 is operating is being performed.

In the present embodiment, the sterilization mode may be manually selected or deselected by the user. Alternatively, the sterilization mode may be automatically selected.

When the sterilization mode is manually or automatically selected, the controller 50 may operate the sterilization module 400 and turn on the first light-emitting unit 214.

When the sterilization mode is manually selected, the sterilization module 400 may continue to operate until the sterilization mode is released (converted to the normal mode). In this case, the first light-emitting unit 214 may be turned off after being turned on for a certain period of time. In this case, the on time of the first light-emitting unit 214 may be shorter than the off time. Turning on and off of the first light-emitting unit 214 may be repeated until the sterilization mode is manually released.

As another example, when the sterilization mode is automatically selected, the sterilization module 400 may be stopped after operating for a reference time.

At this time, the first light-emitting unit 214 may maintain an on state for the reference time. Alternatively, the first light-emitting unit 214 may be turned off after operating for a first time shorter than the reference time.

In a state where the first light-emitting unit 214 is turned on, the intensity of light of the first light-emitting unit 214 may be maintained constant or may be reduced step by step.

The sterilization mode may be automatically selected at a predetermined time interval or whenever the water dispensing amount reaches a reference amount.

According to the present embodiment, since it is possible to sterilize the flow path of the pipe through which water flows and the discharge pipe through which water is dispensed, hygiene can be improved.

In addition, since light of a specific color is transmitted through the transmission member while the sterilization mode is being performed, the user can easily check that the flow path through which the water is dispensed is being sterilized.

In addition, according to the present embodiment, the user can easily check whether the dispenser is in a normal mode (non-sterilization mode) or a sterilization mode by classifying the colors transmitted through the transmission member.

In addition, according to the present embodiment, since the transmission member is disposed in a rounded shape, the user can check the light transmitted through the transmission member regardless of the user's position.

Figure 15:
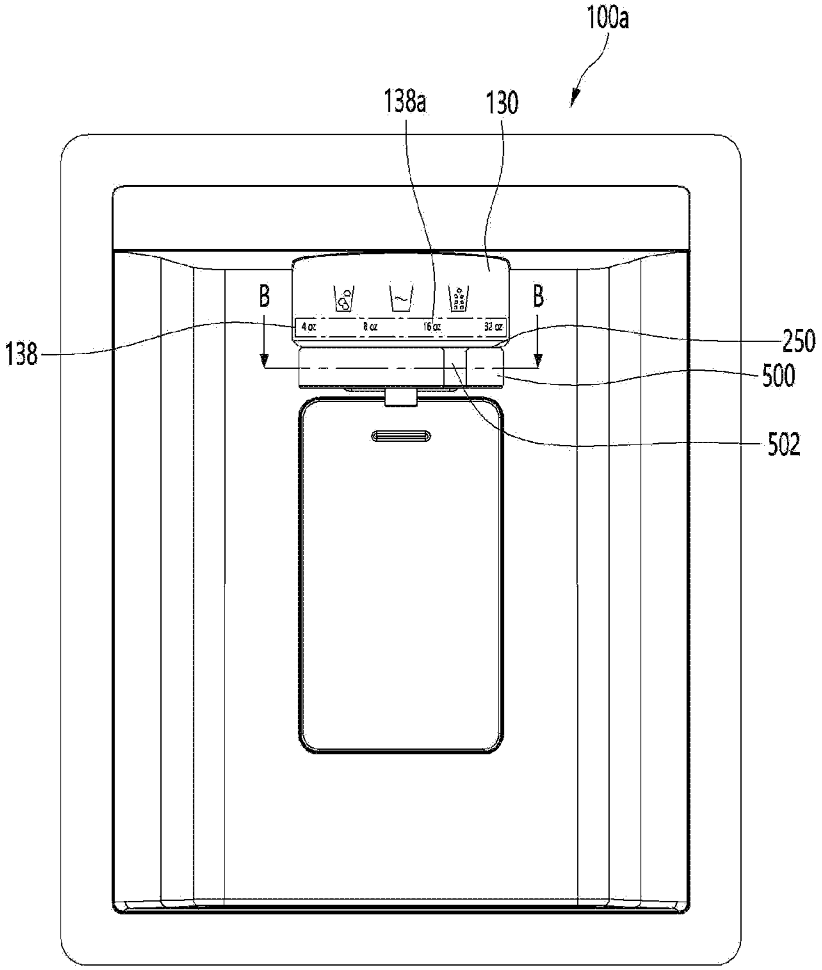
FIG. 15 is a perspective view illustrating a dispenser according to another embodiment of the present disclosure.
Figure 16:
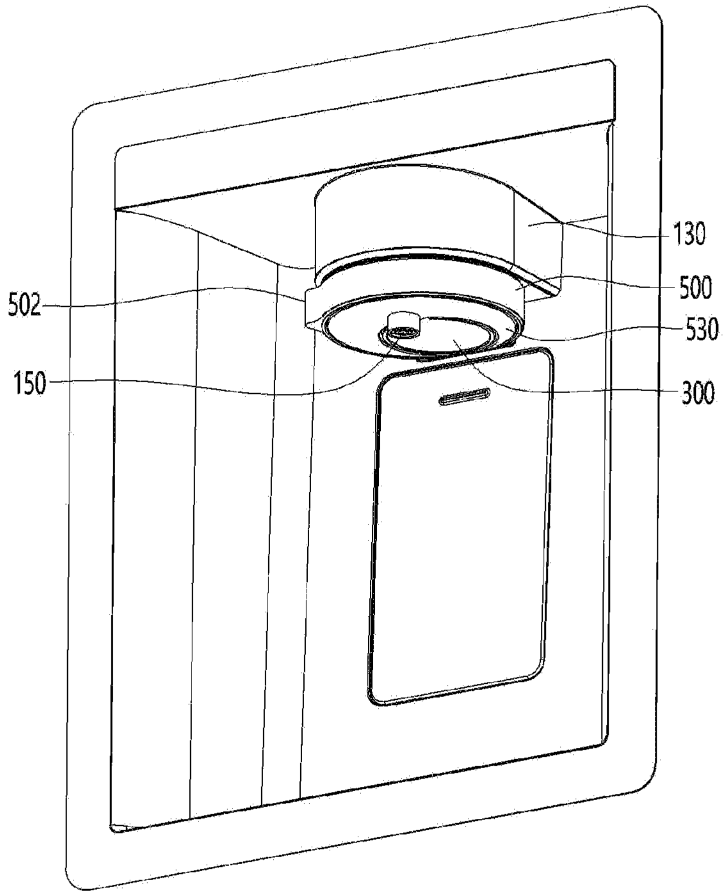
FIG. 16 is a view illustrating the dispenser of FIG. 15 viewed from the lower side of the second body.

FIG. 15 is a perspective view illustrating a dispenser according to another embodiment of the present disclosure, and FIG. 16 is a view illustrating the dispenser of FIG. 15 viewed from the lower side of the second body.

The present embodiment is the same as the previous embodiment in other portions, but there is a difference in that the second body is rotatable. Therefore, only the characteristic portions of the present embodiment will be described below. In other words, the structures and functions of the sterilization module and the lighting module mentioned in the previous embodiment may be equally applied in the present embodiment.

Referring to FIGS. 15 and 16, the dispenser 100*a* of the present embodiment may include a first body 130, and a second body 500 located below the first body 130 and rotatable.

A supporter 530 may be connected to the first body 130. The second body 500 may be rotatably coupled to the supporter 530. The basic shape and location of the supporter 530 of the present embodiment may be the same as or similar to that of the supporter 180 of the previous embodiment. Accordingly, the supporter 530 may be provided with the discharge port 150 and a portion of the ice chute 300 may be positioned to pass through the supporter 530.

The first body 130 may include buttons mentioned in the previous embodiment. In addition, the first body 130 may include a display area 138 for displaying the amount of water to be dispensed.

A plurality of display elements 138*a* displaying the amount of water may be provided in the display area 138. The plurality of display elements 138*a* may be spaced apart from each other in a horizontal direction. A plurality of display elements 138*a* may be positioned below the button. The plurality of display elements 138*a* may be positioned adjacent to the transmission member 250 above the transmission member 250.

The transmission member 250 may be positioned between the plurality of display elements 138*a* and the second body 500.

The amount of water dispensed by the rotational motion of the second body 500 may be selected. In the case of the present embodiment, for example, the amount of water can be adjusted in 4 steps. Accordingly, four display elements 138*a* may be provided on the first body 130.

A protrusion 502 protruding in a radial direction may be provided on a side surface of the second body 500.

The second body 500 may be stopped at a position corresponding to each of the plurality of display elements 138*a* during rotation. The protrusion 502 may correspond to any one of the plurality of display elements 138*a* at the stop position of the second body 500.

The user can select the amount of water to be dispensed by rotating the second body 500 so that the protrusion 502 corresponds to any one of the plurality of display elements 138*a*, and the user can easily check the selected amount of water.

Figure 17:
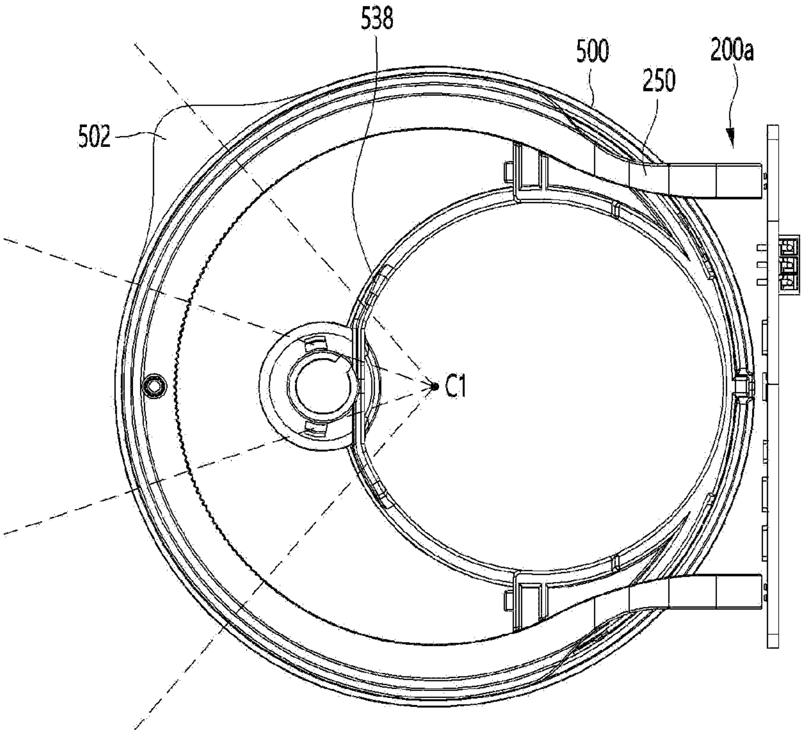
FIG. 17 is a plan view illustrating a disposition relationship between a supporter, a transmission member, and a second body according to another embodiment of the present disclosure.
Figure 18:
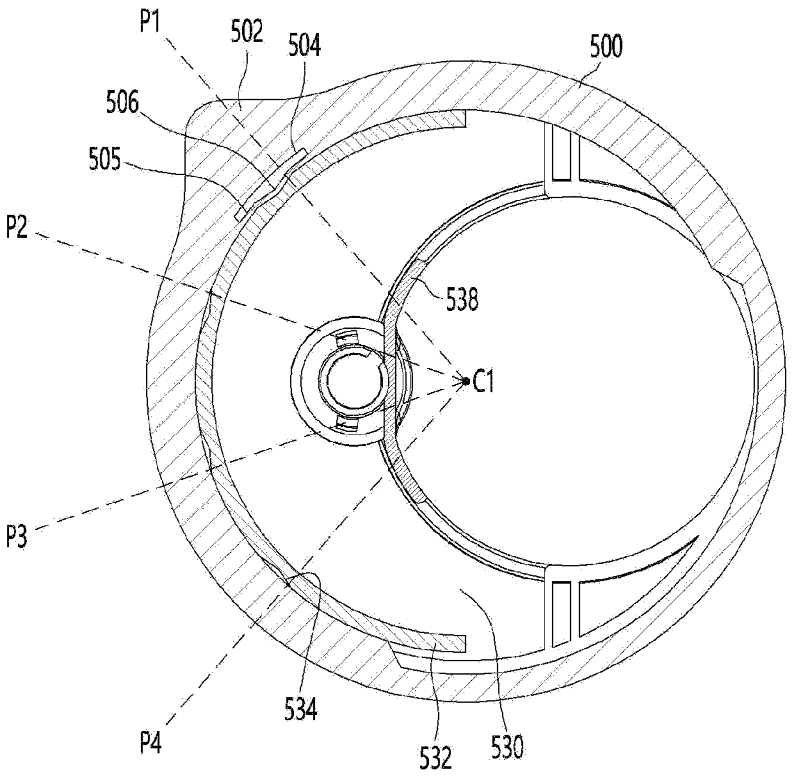
FIG. 18 is a cross-sectional view taken along line B-B of FIG. 15.
Figure 19:
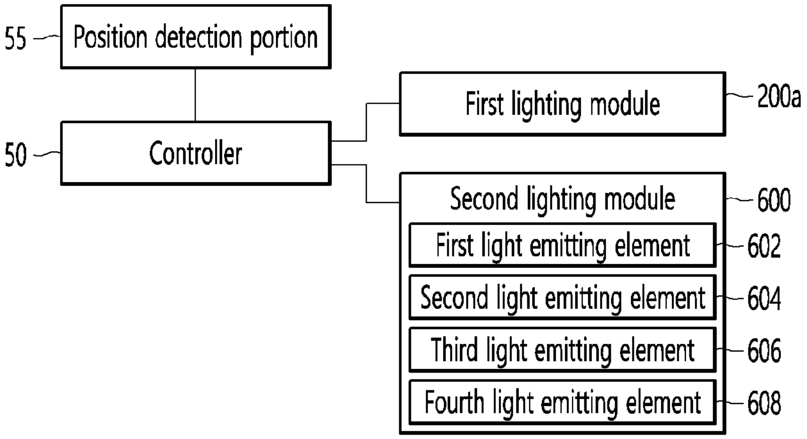
FIG. 19 is a control block diagram of a refrigerator according to another embodiment of the present disclosure.
Figure 20:
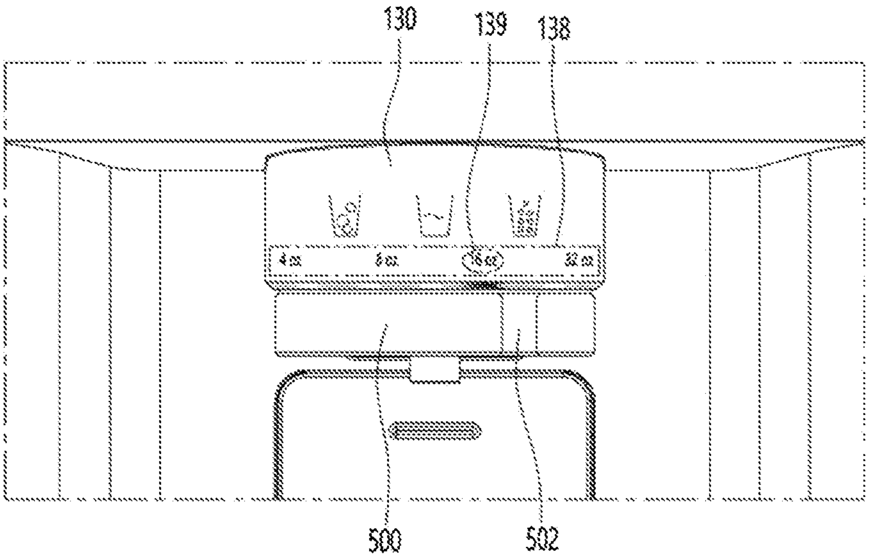
FIG. 20 is a view illustrating a state where the second body is stopped at a third point according to another embodiment of the present disclosure.

FIG. 17 is a plan view illustrating a disposition relationship between a supporter, a transmission member, and a second body according to another embodiment of the present disclosure, FIG. 18 is a cross-sectional view taken along line B-B of FIG. 15, FIG. 19 is a control block diagram of a refrigerator according to another embodiment of the present disclosure, and FIG. 20 is a view illustrating a state where the second body is stopped at a third point according to another embodiment of the present disclosure.

Referring to FIGS. 17 to 20, the second body 500 may be formed in a hollow cylindrical shape. The rotational center C1 of the second body 500 may pass through the transmission member 250 and the supporter 530.

The supporter 530 may rotatably support the second body 500. The supporter 530 may include a rounded guide rib 532 for guiding rotation of the second body 500.

The second body 500 may include an elastic deformation portion 505 so that the second body 500 can be stopped at four points P1, P2, P3, and P4 while being rotated. The elastic deformation portion 505 may be deformed in the radial direction of the second body 500 by the slot 504 formed at a position spaced outward in the radial direction from the inner circumferential surface. A protrusion 506 may be provided at a central portion of the elastic deformation portion 505.

The protrusion 506 may protrude from the elastic deformation portion 505 toward the rotational center C1. A plurality of protrusion grooves 534 for accommodating the protrusion 506 may be provided in the guide rib 532 of the supporter 530. The plurality of protrusion grooves 534 may be spaced apart in a horizontal direction.

While the second body 500 rotates, the protrusion 506 may be elastically deformed in a direction away from the guide rib 532 by the guide rib 532. When the protrusion 506 is aligned with any one of the plurality of protrusion grooves 534, the second body 500 may be stopped by inserting the protrusion 506 into the aligned protrusion groove.

The second body 500 may be stopped at any one of four points P1, P2, P3, and P4 by the protrusion 506 and the plurality of protrusion grooves 534.

The refrigerator may further include a position detection portion 55 that detects a rotational position of the second body 500. The position detection portion 55 may be an optical sensor, a hall sensor, or a switch that detects mechanical position. It should be noted that there is no limitation on the type of the position detection portion 55 in the present embodiment.

The controller 50 may determine the amount of water to be dispensed by detecting the position of the second body 500 by the position detection portion 55.

The refrigerator may further include a first lighting module 200*a*. The first lighting module 200*a* of the present embodiment may perform the same function as the lighting module 200 of the previous embodiment.

The refrigerator may further include a second lighting module 600. The second lighting module 600 may emit light to a portion of the transmission member 250 corresponding to the protrusion 502 so that the user can easily check the amount of water selected when the second body 500 is rotated and stopped at one of the four points P1, P2, P3, and P4 to select a specific amount of water.

The second lighting module 600 may include first to fourth light emitting elements 602, 604, 606, and 608.

When the position detection portion 55 detects the position of the second body 500, the controller 50 can turn on any one of the first to fourth light emitting elements 602, 604, 606, and 608.

For example, as illustrated in FIG. 20, when the second body 500 is stopped at the third point P3, the controller 50 may turn on the third light emitting element 606.

When the second body 500 is stopped at the third point P3, the protrusion 502 may be located below the display element (for example, "16 oz") 139 corresponding to the third point.

A color of light emitted from the first lighting module 200*a* may be different from a color of light emitted from each of the light emitting elements 602, 604, 606, and 608.

Since the color of light transmitted in a portion corresponding to the amount of water selected by the user is different from the color of light transmitted in the remaining portion in the transmission member 250, even if the user is located far away from the dispenser 100*a*, the selected amount of water can be easily checked.

Figure 21:
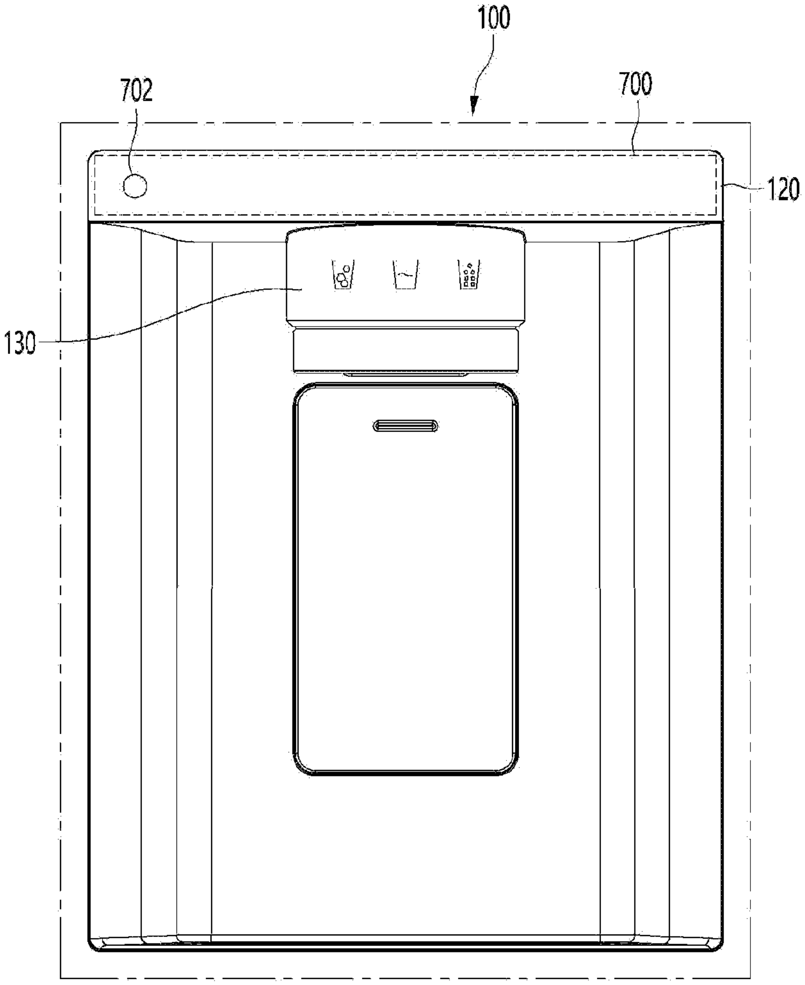
Figure 22:
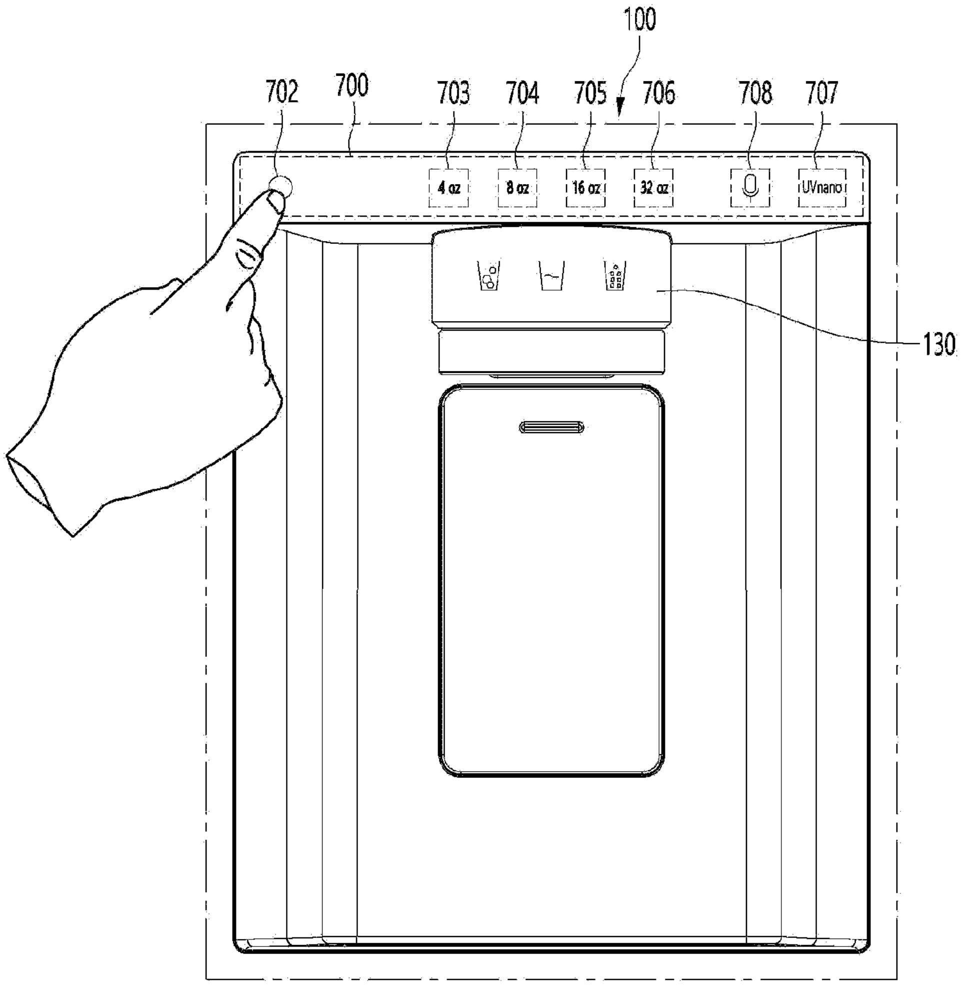
Figure 23:
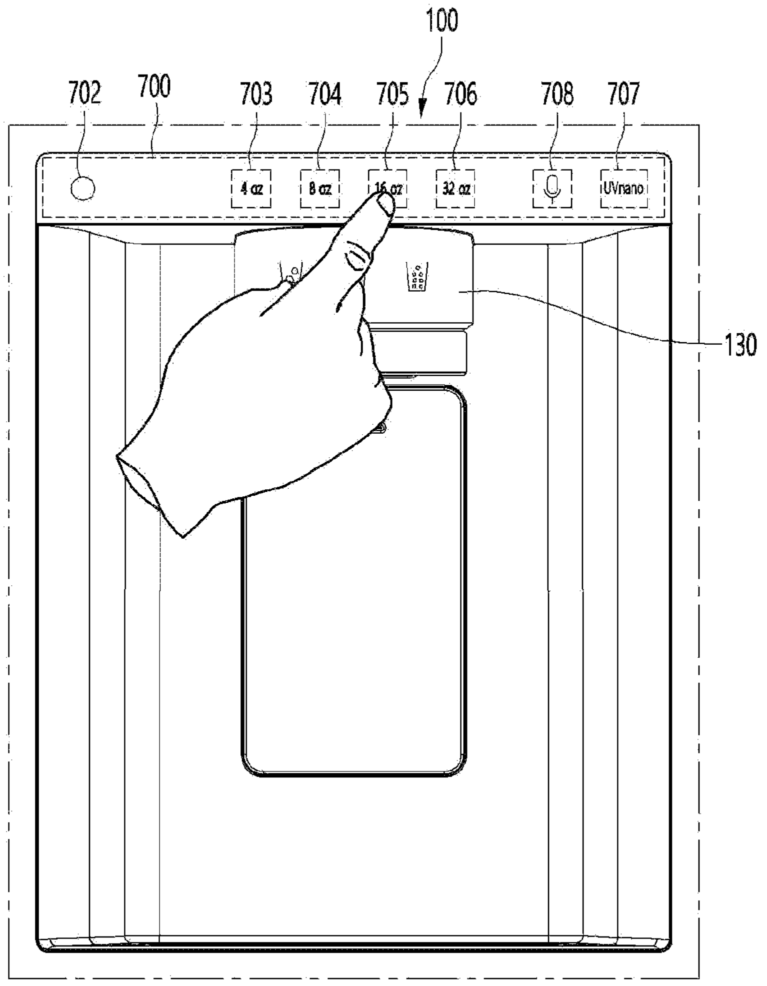
Figure 24:
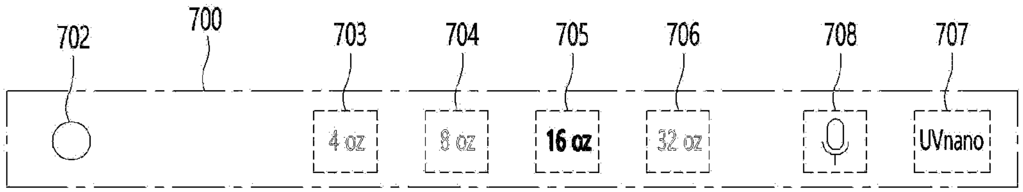

FIGS. 21 to 24 are views illustrating a dispenser according to another embodiment of the present disclosure, wherein FIG. 21 illustrates a state where the main key of the input portion is displayed, FIG. 22 illustrates a state where the main key of the input portion and a plurality of selection keys are displayed, FIG. 23 illustrates a state where one of a plurality of selection keys is selected, and FIG. 24 is a view illustrating a state where one selection key in FIG. 23 is selected.

The present embodiment is the same as the previous embodiment in other portions, except that the dispenser includes a separate input portion. Therefore, only the characteristic portions of the present embodiment will be described below.

Referring to FIGS. 21 to 24, the dispenser 100 of the present embodiment may further include an input portion 700 disposed on the dispenser cover 120.

The input portion 700 may be located above the first body 130.

In the input portion 700, the main key 702 (or main button) may be activated in a standby state. The main key 702 is a portion touched by a user, and the controller 50 may mechanically or electronically detect a touch of the main key 702.

In the present embodiment, activation of a specific key may mean "a state where manipulation of a specific key can be detected" and "a state where a light emitting element emits light to a specific key so that a user can check a specific key".

The dispenser 100 may further include a key lighting module (see 800 in FIG. 25) including a plurality of light emitting elements that emit light to the specific key.

The input portion 700 is disposed in a shape elongated in the left and right direction, and the main key 702 may be located adjacent to a left or right end portion of the input portion 700.

The input portion 700 may further include a plurality of selection keys 703 to 707 (or selection buttons).

In the standby state, the main key 702 may be activated, and the plurality of selection keys 703 to 707 may be deactivated. In a state where the plurality of selection keys 703 to 707 are inactivated, the plurality of selection keys 703 to 707 are not exposed to the outside.

Therefore, in the input portion 700, since the main key 702 is exposed to the outside, there is an advantage in that the aesthetics of the dispenser 100 can be improved, and a light emitting element corresponding to a plurality of selection keys 703 to 707 can be prevented from operating unnecessarily.

In the standby state, when the user selects the main key 702, a plurality of selection keys 703 to 707 may be activated. The plurality of selection keys 703 to 707 may be arranged spaced apart in a horizontal direction.

When the plurality of selection keys 703 to 707 are activated, the user can check the plurality of selection keys 703 to 707 on the input portion 700.

The plurality of selection keys 703 to 707 may include, for example, amount selection keys 703, 704, 705, and 706 for selecting the amount of water to be dispensed.

The amount selection keys 703, 704, 705, and 706 may be located at the center of the input portion 700, for example. The first body 130 may be positioned directly below the amount selection keys 703, 704, 705, and 706. The first body 130 may include buttons mentioned in the previous embodiment.

As another example, the amount selection keys 703, 704, 705, and 706 may be replaced with buttons provided on the first body 130. In other words, it is possible that the plurality of selection keys 703 to 707 include a selection key for selecting the dispensing of water or ice and a selection key for selecting the type of ice to be dispensed.

The plurality of selection keys 703 to 707 may further include a sterilization mode selection key 707 for manually selecting a sterilization mode.

The input portion 700 may further include a display element 708 displaying that a specific function can be implemented. For example, the specific function may be a voice recognition function.

As another example, the input portion 700 may further include a function selection key 708 for selecting a specific function. When the function selection key 708 is selected in a state where the function selection key 708 is activated, a voice command can be input.

As illustrated in FIG. 23, the user can select any one of the plurality of selection keys 703 to 707. If the main key 702 is selected and the plurality of selection keys 703 to 707 are activated and a specific selection key is not selected until the first set time elapses, the plurality of selection keys 703 to 707) may be deactivated.

When any one of the plurality of selection keys 703 to 707 is selected, the light intensity of the selected selection key may increase as illustrated in FIG. 24. In this case, the user can easily check the selected key.

When a second set time elapses after any one of the plurality of selection keys 703 to 707 is selected, the plurality of selection keys 703 to 707 may be deactivated. The first set time may be the same as or different from the second set time.

After any one of the plurality of selection keys 703 to 707 is selected, the second set time elapses and in a state where the plurality of selection keys 703 to 707 are deactivated, the main key 702 is selected again. It can be. In this case, the plurality of selection keys 703 to 707 are activated, and the previously selected selection key may have a higher light intensity than other selection keys. Thus, the user can easily check the previously selected selection key.

Figure 25:
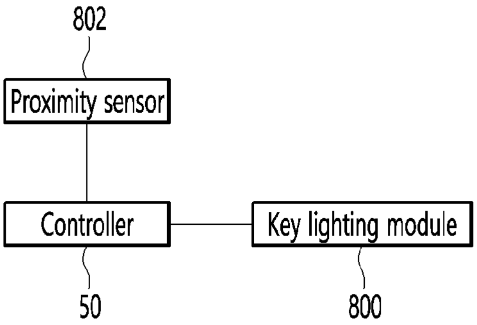
FIG. 25 is a block diagram of a refrigerator according to another embodiment of the present disclosure.

FIG. 25 is a block diagram of a refrigerator according to another embodiment of the present disclosure.

The present embodiment is the same as the content described in FIGS. 21 to 24 in other portions, but there is a difference in the activation timing of the main key. Therefore, hereinafter, the characteristic portions of the present embodiment will be described.

Referring to FIG. 25, the refrigerator of the present embodiment may include a proximity sensor 802 for detecting a state where a user approaches the refrigerator door. The proximity sensor 802 may be disposed on a refrigerator door equipped with a dispenser.

The main key 702 may be deactivated in a standby state. The controller 50 may control the main key 702 to be activated when it is detected by the proximity sensor 802 that a user approaches the refrigerator door within a predetermined distance. For example, a light emitting element corresponding to the main key 702 may be turned on in the key lighting module 800 to expose the main key 702 to the outside.

In the present embodiment, since a state where the key lighting module 800 is turned off is maintained until the proximity sensor 802 detects that the user has approached the refrigerator door within a predetermined distance, there is an advantage in that power consumption can be reduced.

The invention claimed is:

1. A refrigerator comprising:
a cabinet having a storage space;
a refrigerator door configured to open and close the storage space; and
a dispenser provided on the refrigerator door and configured to dispense at least one of a liquid or ice,
wherein the dispenser includes:
a dispenser housing configured to form a space;
a cover protruding into the space from an upper side wall of the dispenser housing;
an ice chute through which the ice is discharged and provided in the cover;
a plurality of light emitters including a first light emitter to output light of a first color and a second light emitter to output light of a second color different from the first color;
a lighting printed circuit board (PCB) on which the plurality of light emitters is installed;
a transmission member provided along at least a portion of a perimeter of the cover, the transmission member being positioned to receive light from the plurality of light emitters and to output the light; and
a controller configured to selectively activate at least one of the plurality of light emitters according to a mode of the dispenser,
wherein the transmission member includes a first region provided to at least partially surround a section of the ice chute, and
wherein at least a portion of the ice chute is disposed between the first region and the lighting printed circuit board (PCB).

2. The refrigerator of claim 1, wherein a discharge pipe through which the liquid is dispensed is provided in the cover.

3. The refrigerator of claim 2, further comprising:
an ultraviolet (UV) light emitter configured to output UV light into the discharge pipe,
wherein the mode of the dispenser includes a normal mode in which the UV light emitter does not operate and a sterilization mode in which the UV light emitter operates,
wherein the dispenser further includes a lever that is manipulated to request dispensing of the liquid or the ice, and
wherein the controller turns on the first light emitter of the plurality of light-emitters in the sterilization mode such that the first color is output through the transmission member, and turns on the second light emitter of the plurality of light-emitters such that the second color is output through the transmission member when a manipulation of the lever is detected in the normal mode.

4. The refrigerator of claim 3,
wherein the cover includes a first body having a rounded region; and a second body provided below the first body, and
wherein the first region is provided at a boundary between the first body and the second body and exposed to an outside the cover.

5. The refrigerator of claim 1,
wherein the first region of the transmission member includes an outer circumferential surface exposed to the space formed by dispenser housing and an inner circumferential surface positioned opposite to the outer circumferential surface, and
wherein at least a portion of the inner circumferential surface is uneven to scatter light emitted from the inner circumferential surface.

6. The refrigerator of claim 1, wherein the transmission member further includes a second region that extends at an incline relative to a horizontal direction from the first region; and a pair of third regions extending from the second region toward the plurality of light emitters.

7. The refrigerator of claim 4, wherein at least a portion of the UV light emitter is located in an area formed within the first region of the transmission member.

8. The refrigerator of claim 4, wherein the first body includes one or more buttons to receive an input related to selecting at least one of the liquid or the ice to be dispensed.

9. The refrigerator of claim 1,
wherein the dispenser further includes a lever manipulated by a user to initiate dispensing of the liquid or the ice,
wherein the dispenser housing includes a rear wall having a recessed region in which the lever is accommodated, and
wherein a front surface of the lever is aligned with another region of the rear wall outside of the recessed region when the lever is not manipulated.

10. The refrigerator of claim 1,
wherein the cover includes a first body protruding into the space from the upper side wall of the dispenser housing; and a second body rotatably provided below the first body, and wherein a user rotates the second body to select an amount of the liquid to be dispensed.

11. The refrigerator of claim 1, wherein the dispenser further includes a lever for that is manipulated to request dispensing of the liquid or the ice, the lever is disposed lower than the cover, and the transmission member is disposed higher than an upper end of the lever.

12. The refrigerator of claim 1, wherein a horizontal distance between a curvature center of the first region and the lighting printed circuit board (PCB) is greater than a radius of the first region.

13. The refrigerator of claim 1, wherein the dispenser further includes an additional printed circuit board on which an additional light emitter is installed, and at least a portion of the ice chute is disposed between the lighting printed circuit board (PCB) and the additional printed circuit board.

14. The refrigerator of claim 6, wherein a radius of the first region is less than a distance between the pair of third regions.

15. The refrigerator of claim 6, wherein a diameter of the first region is greater than a distance between the pair of third regions.

16. A refrigerator comprising:

a cabinet having a storage space;

a refrigerator door configured to open and close the storage space; and a dispenser provided on the refrigerator door and configured to dispense at least one of a liquid or ice, wherein the dispenser includes:

a dispenser housing configured to form a space;

a cover protruding into the space from an upper side wall of the dispenser housing;

an ice chute through which the ice is discharged and provided in the cover;

a plurality of light emitters including a first light emitter to output light of a first color and a second light emitter to output light of a second color different from the first color;

a lighting printed circuit board (PCB) on which the plurality of light emitters is installed;

a transmission member provided along at least a portion of a perimeter of the cover, the transmission member being positioned to receive light from the plurality of light emitters and to output the light; and a controller configured to selectively activate at least one of the plurality of light emitters, wherein the transmission member includes a first region provided to at least partially surround a section of the ice chute, wherein the cover includes a first body having a rounded region; and a second body provided below the first body, and wherein the first region is provided at a boundary between the first body and the second body and exposed to an outside the cover.

17. The refrigerator of claim 16, further comprising:

a lighting printed circuit board (PCB) on which the plurality of light emitters is installed; and a supporter configured to connect the second body and the first body, wherein at least a portion of the supporter is accommodated in the cover, and the supporter is configured to support at least one of the transmission member or the lighting printed circuit board (PCB).

18. A refrigerator comprising:

a cabinet having a storage space;

a refrigerator door configured to open and close the storage space; and a dispenser provided on the refrigerator door and configured to dispense at least one of a liquid or ice, wherein the dispenser includes:

a dispenser housing configured to form a space;

a cover protruding into the space from an upper side wall of the dispenser housing;

a plurality of light emitters including a plurality of first light emitters to output light of a first color and a plurality of second light emitters to output light of a second color different from the first color;

a lighting printed circuit board (PCB) on which the plurality of light emitters is installed;

a transmission member provided along at least a portion of a perimeter of the cover, the transmission member being positioned to receive light from the plurality of light emitters and to output the light; and a controller configured to selectively activate at least one of the plurality of light emitters, and wherein the transmission member includes a first end and a second end spaced apart from the first end, one of the first light emitters and one of the second light emitters are disposed to face the first end, and another one of the first light emitters and another one of the second light emitters are disposed to face the second end.

19. The refrigerator of claim 18, wherein the transmission member includes:

a first region, a second region that extends from the first region; and a pair of third regions extending from the second region toward the plurality of light emitters, wherein one of the pair of third regions includes the first end, and another one of the pair of third regions includes the second end.

20. The refrigerator of claim 19, wherein a radius of the first region is less than a distance between the pair of third regions, or a diameter of the first region is greater than a distance between the pair of third regions.

* * * * *